(12) United States Patent
Yamasaki et al.

(10) Patent No.: US 9,949,092 B2
(45) Date of Patent: Apr. 17, 2018

(54) COMMUNICATION DEVICE, TRANSMISSION INTERVAL CONTROL DEVICE, METHOD FOR TRANSMITTING LOCATION INFORMATION, METHOD FOR CONTROLLING TRANSMISSION INTERVAL OF LOCATION INFORMATION, AND RECORDING MEDIUM

(71) Applicant: NEC Corporation, Minato-ku, Tokyo (JP)

(72) Inventors: Kenichi Yamasaki, Tokyo (JP); Masayuki Sakata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/397,256

(22) PCT Filed: Mar. 15, 2013

(86) PCT No.: PCT/JP2013/057501
§ 371 (c)(1),
(2) Date: Oct. 27, 2014

(87) PCT Pub. No.: WO2013/161439
PCT Pub. Date: Oct. 31, 2013

(65) Prior Publication Data
US 2015/0111599 A1 Apr. 23, 2015

(30) Foreign Application Priority Data
Apr. 26, 2012 (JP) .................................. 2012-101445

(51) Int. Cl.
*H04W 24/00* (2009.01)
*H04W 4/04* (2009.01)
(Continued)

(52) U.S. Cl.
CPC .......... *H04W 4/046* (2013.01); *G08G 1/0112* (2013.01); *G08G 1/0133* (2013.01);
(Continued)

(58) Field of Classification Search
CPC .. H04W 4/04; H04W 4/046; G08G 1/096716; G08G 1/096741; G08G 1/0133;
(Continued)

(56) References Cited

U.S. PATENT DOCUMENTS

2002/0008644 A1   1/2002   Flick
2002/0158778 A1   10/2002  Flick
(Continued)

FOREIGN PATENT DOCUMENTS

JP   6-18648 A    1/1994
JP   8-233930 A   9/1996
(Continued)

OTHER PUBLICATIONS

International Search Report for PCT Application No. PCT/JP2013/057501, dated May 21, 2013.
(Continued)

*Primary Examiner* — Lester Kincaid
*Assistant Examiner* — Sayed T Zewari

(57) ABSTRACT

A communication device, which is to be mounted on a vehicle, includes: identifying means that identifies a location of the communication device; communication means that successively transmits location information that indicates the location of the communication device that is identified by the identifying means; and setting means that sets a transmission interval at which the location information is to be transmitted in accordance with the location of the communication device that is identified by the identifying means.

9 Claims, 9 Drawing Sheets

(51) Int. Cl.
*G08G 1/01* (2006.01)
*G08G 1/0967* (2006.01)
*G08G 1/16* (2006.01)

(52) U.S. Cl.
CPC ..... *G08G 1/0141* (2013.01); *G08G 1/096716* (2013.01); *G08G 1/096741* (2013.01); *G08G 1/096775* (2013.01); *G08G 1/162* (2013.01)

(58) Field of Classification Search
CPC ............... G08G 1/0141; G08G 1/0112; G08G 1/096775; G08G 1/162
USPC ......... 455/456.1, 456.3, 456.2, 456.4, 456.6, 455/457
See application file for complete search history.

(56) References Cited

U.S. PATENT DOCUMENTS

| | | | | |
|---|---|---|---|---|
| 2008/0288406 | A1* | 11/2008 | Seguin | G06Q 30/02 705/50 |
| 2009/0005070 | A1* | 1/2009 | Forstall | G01C 21/12 455/456.1 |
| 2010/0198454 | A1* | 8/2010 | Sugawara | G08G 1/20 701/31.4 |
| 2013/0237191 | A1* | 9/2013 | Mahaffey | H04L 41/0253 455/411 |

FOREIGN PATENT DOCUMENTS

| | | |
|---|---|---|
| JP | 9-135184 A | 5/1997 |
| JP | 2001-016639 A | 1/2001 |
| JP | 2003-332949 A | 11/2003 |
| JP | 2004-233192 A | 8/2004 |
| JP | 2006-277538 A | 10/2006 |
| JP | 2007-265074 A | 10/2007 |
| JP | 2008-42738 A | 2/2008 |
| JP | 2008-83918 A | 4/2008 |
| JP | 2009-20685 A | 1/2009 |
| JP | 2009-59199 A | 3/2009 |
| JP | 2010-178296 A | 8/2010 |
| JP | 2010-277596 A | 12/2010 |
| JP | 2012-14718 A | 1/2012 |
| WO | 2010/064345 A1 | 6/2010 |

OTHER PUBLICATIONS

Extended European Search Report for EP Application No. EP13782304.3 dated Mar. 16, 2016.

\* cited by examiner

COMMUNICATION DEVICE, TRANSMISSION INTERVAL CONTROL DEVICE, METHOD FOR TRANSMITTING LOCATION INFORMATION, METHOD FOR CONTROLLING TRANSMISSION INTERVAL OF LOCATION INFORMATION, AND RECORDING MEDIUM

This application is a National Stage Entry of PCT/JP2013/057501 filed on Mar. 15, 2013, which claims priority from Japanese Patent Application 2012-101445 filed on Apr. 26, 2012, the contents of all of which are incorporated herein by reference, in their entirety.

TECHNICAL FIELD

The present invention relates to a communication device, a transmission interval control device, a method for transmitting location information, a method for controlling a transmission interval of location information and a recording medium; and particularly relates to a communication device that is to be mounted in a vehicle, a transmission interval control device, a method for transmitting location information, a method for controlling a transmission interval of location information and a recording medium.

BACKGROUND ART

In ITS (Intelligent Transport Systems), road-vehicle-vehicle communication is studied in which information is exchanged between a road-side device and a vehicle or between vehicles by using an ad-hoc wireless network.

On the other hand, research into inter-vehicle communication that uses a mobile communication network [for example, 3G, LTE (Long Term Evolution)] has also been undertaken recently.

In order for a center to provide a mobile terminal, such as a cellular terminal (for example, a smart phone) or a dedicated onboard device and so on, with telematics services or road-vehicle-vehicle collaborative services (hereinafter referred to as "information notification services" collectively) which use location information of a vehicle transmitted via a mobile communication network, a location management server in the center needs to collect location information transmitted from mobile terminals via base stations.

However, transmitting location information at high frequency from a mobile terminal that is mounted on a vehicle, leads to an increase in traffic and to over use of the network bandwidth. Therefore, an improvement in the efficiency of the communication of the location information is required.

Patent Documents 1 and 2 describe an onboard communication device that dynamically changes a transmission interval of location information as necessary in order to improve the efficiency of the communication of the location information. The onboard communication device, which is described in Patent Document 1, shortens the transmission interval when a dangerous vehicle approaches. The onboard communication device, which is described in Patent Document 2, changes the transmission interval in accordance with the speed of the approaching vehicle.

CITATION LIST

Patent Documents

Patent Document 1: JP2009-59199A
Patent Document 2: JP2012-14718A

SUMMARY OF INVENTION

Problem to be Solved by the Invention

According to the onboard communication devices described in Patent Documents 1 and 2, it is possible to improve the efficiency of the communication of the location information by changing the transmission interval in accordance with a state of the approach of a dangerous vehicle or the speed of a vehicle. However, the problem arises that a further method is needed for improving the efficiency of the communication of the location information.

It is an object of the present invention to provide a communication device, a transmission interval control device, a method for transmitting location information, a method for controlling a transmission interval of location information and a recording medium that can solve the above-described problem.

Means for Solving the Problem

A communication device according to the present invention is a communication device that is to be mounted on a vehicle and that includes:

identifying means that identifies a location of the communication device;

communication means that successively transmits location information that indicates the location of the communication device that is identified by the identifying means; and setting means that sets a transmission interval at which the location information is to be transmitted in accordance with the location of the communication device that is identified by the identifying means.

A communication device according to the present invention is a communication device that is to be mounted on a vehicle and that includes:

location identifying means that identifies a location of the communication device;

communication means that successively transmits location information that indicates the location of the communication device that is identified by the location identifying means; and setting means that receives an input that indicates any one state from among the states: acceleration of the vehicle, direction of travel of the vehicle, a state of an operation of a direction indicator of the vehicle, a situation of an area in which the vehicle is present, current date and time, current time, a state of current weather and a kind of the vehicle, and sets a transmission interval at which the location information is to be transmitted in accordance with the input.

A transmission interval control device according to the present invention includes:

communication means that communicates with a communication partner; and communication control means that, when the communication means receives location information of the communication partner from the communication partner, transmits transmission interval information, which indicates a transmission interval that is based on the location information, from the communication means to the communication partner.

A transmission interval control device according to the present invention includes:

communication means that communicates with a communication partner in a vehicle; and communication control means that receives an input that indicates any one state from among the states: a situation of an area in which the vehicle is present, current date and time, current time, a state of current weather and a kind of the vehicle, and transmits transmission interval information, which indicates a transmission interval that is based on the input, from the communication means to the communication partner.

A method for transmitting location information according to the present invention is a method for transmitting location information in a communication device that is to be mounted on a vehicle, wherein the method for transmitting location information includes:

identifying a location of the communication device;

successively transmitting location information that indicates the location of the communication device; and setting a transmission interval at which the location information is to be transmitted in accordance with the location of the communication device.

A method for transmitting location information according to the present invention is a method for transmitting location information in a communication device that is to be mounted on a vehicle, wherein the method for transmitting location information includes:

identifying a location of the communication device;

successively transmitting location information that indicates the location of the communication device;

receiving an input that indicates any one state from among the states: acceleration of the vehicle, direction of travel of the vehicle, a state of an operation of a direction indicator of the vehicle, a situation of an area in which the vehicle is present, current date and time, current time, a state of current weather and a kind of the vehicle; and setting a transmission interval at which the location information is to be transmitted in accordance with the input.

A method for controlling a transmission interval at which location information is to be transmitted according to the present invention is a method for controlling a transmission interval of location information in a transmission interval control device, wherein the method for controlling a transmission interval of location information includes:

upon receipt of location information of a communication partner from the communication partner, transmitting transmission interval information, which indicates a transmission interval that is based on the location information, to the communication partner.

A method for controlling a transmission interval at which location information is to be transmitted according to the present invention is a method for controlling a transmission interval at which the location information is to be transmitted in a transmission interval control device that communicates with a communication partner in a vehicle, wherein the method for controlling a transmission interval of location information includes:

receiving an input that indicates any one state from among the states: a situation of an area in which the vehicle is present, current date and time, current time, a state of current weather and a kind of the vehicle; and transmitting transmission interval information, which indicates a transmission interval that is based on the input, from the communication means to the communication partner.

A recording medium according to the present invention is a recording medium that can be read into a computer and on which is recorded a program for causing a computer, which is to be mounted on a vehicle, to execute:

an identifying procedure of identifying a location of the computer;

a communication procedure of successively transmitting location information that indicates the location of the computer; and a setting procedure of setting a transmission interval at which the location information is to be transmitted in accordance with the location of the computer.

A recording medium according to the present invention is a recording medium that can be read into a computer and on which is recorded a program for causing a computer, which is to be mounted on a vehicle, to execute:

an identifying procedure of identifying a location of the computer;

a communication procedure of successively transmitting location information that indicates the location of the computer; and a setting procedure of receiving an input that indicates any one state from among the states: acceleration of the vehicle, direction of travel of the vehicle, a state of an operation of a direction indicator of the vehicle, a situation of an area in which the vehicle is present, current date and time, current time, a state of current weather and the kind of vehicle to set a transmission interval at which the location information is to be transmitted in accordance with the input.

A recording medium according to the present invention is a recording medium that can be read into a computer and on which is recorded a program for causing a computer to execute:

a communication control procedure of, upon receipt of location information of a communication partner from the communication partner, transmitting transmission interval information, which indicates a transmission interval that is based on the location information, to the communication partner.

A recording medium according to the present invention is a recording medium that can be read into a computer and on which is recorded a program for causing a computer, which communicates with a communication partner in a vehicle, to execute:

a communication control procedure of receiving an input that indicates any one state from among the states: a situation of an area in which the vehicle is present, current date and time, current time, a state of current weather and a kind of the vehicle, and transmitting transmission interval information, which indicates a transmission interval that is based on the input, from the communication means to the communication partner.

Effect of the Invention

According to the present invention, it is possible to improve the efficiency of the communication of the location information.

MODE FOR CARRYING OUT THE INVENTION

Exemplary embodiments according to the present invention will be described below with reference to the drawings.

First Exemplary Embodiment

Figure 1:
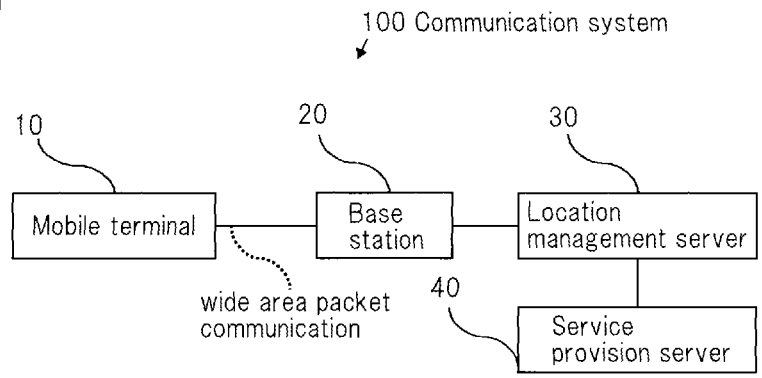
FIG. 1 is a diagram showing communication system 100 of a first exemplary embodiment according to the present invention.

FIG. 1 is a diagram showing communication system 100 of a first exemplary embodiment according to the present invention.

In FIG. 1, communication system 100 includes mobile terminal 10, base station 20, location management server 30 and service provision server 40. In FIG. 1, the number of mobile terminal 10 is one, and the number of base station 20 is one, however, the number of mobile terminal 10 and the number of base station 20 may be two or more.

Mobile terminal 10 is one example of a communication device that is to be mounted on a vehicle.

Mobile terminal 10 is a mobile terminal or dedicated onboard device that is used by a user (for example, a driver) in a vehicle. The mobile terminal is, for example, a mobile phone or a smart phone. The dedicated onboard device is, for example, a car navigation system or PND (Personal Navigation Device). Mobile terminal 10 is mounted on a vehicle, and adapted to a wide area packet communication.

Mobile terminal 10 transmits a message (hereinbelow referred to as "location information message") that contains location information of mobile terminal 10 and identification information of mobile terminal 10. In the present exemplary embodiment, mobile terminal 10 successively transmits the location information message at time intervals.

Base station 20 is a base station in a mobile communication network, and is connected to mobile terminal 10 to communicate with mobile terminal 10. Base station 20 receives location information messages from mobile terminal 10 that is connected to base station 20.

Location management server 30 gathers location information messages of mobile terminal 10 via base station 20, and manages location information of mobile terminal 10 in the location information messages for each mobile terminal 10.

Service provision server 40 provides telematics services that are used for vehicle or road-vehicle/vehicle-vehicle collaborative services on the basis of location information of mobile terminal 10 that is managed by location management server 30.

Figure 2:
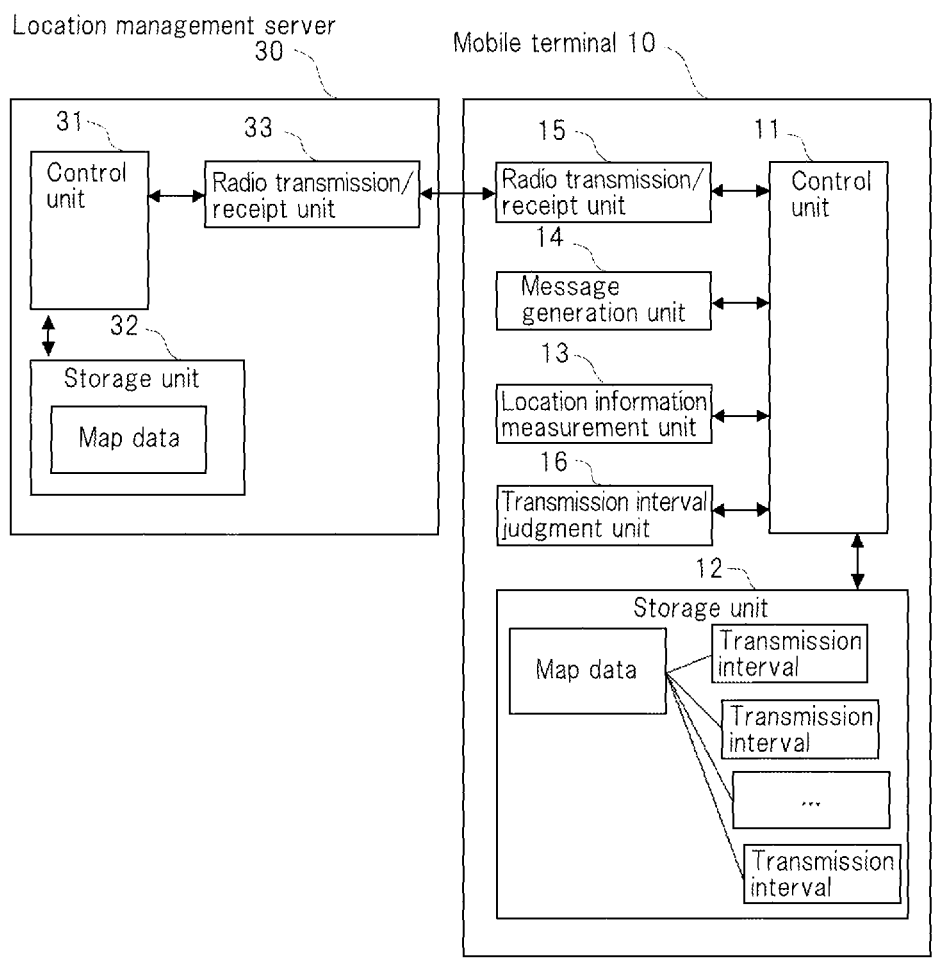
FIG. 2 is a function block diagram showing mobile terminal 10 and location management server 30.

FIG. 2 is a function block diagram showing mobile terminal 10 and location management server 30.

First, the function block diagram showing mobile terminal 10 will be explained.

Mobile terminal 10 includes control unit 11, storage unit 12, location information measurement unit 13, message generation unit 14, radio transmission/receipt unit 15 and transmission interval judgment unit 16.

Control unit 11 controls the fundamental operation of mobile terminal 10 such as task management and memory management and so on.

Storage unit 12 is one example of storage means.

Storage unit 12 stores a location and a transmission interval which are associated with each other.

In the present exemplary embodiment, storage unit 12 stores digital road map data that includes road information.

Figure 3:
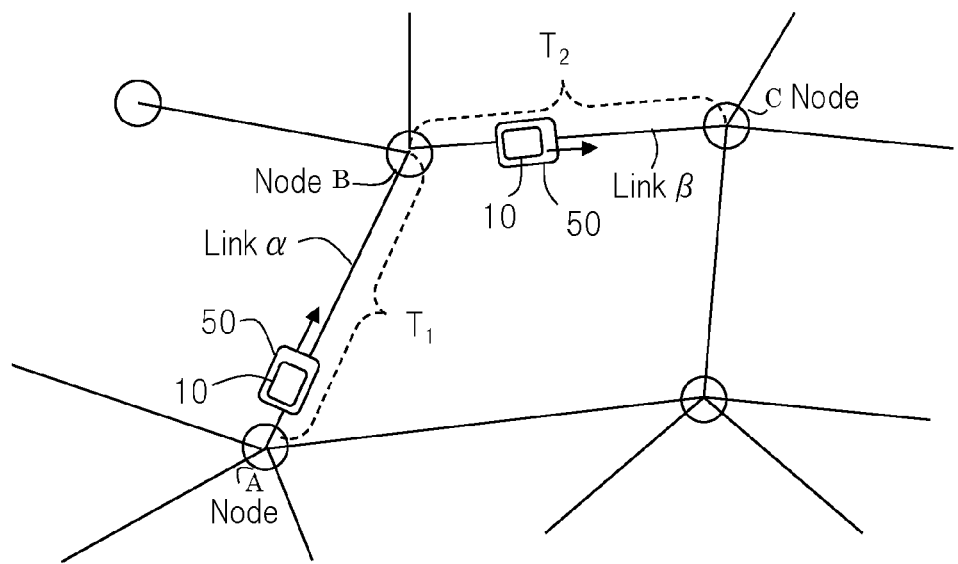
FIG. 3 is a diagram showing one example of the digital road map data.

FIG. 3 is a diagram showing one example of the digital road map data.

In FIG. 3, the digital road map data is comprised by a plurality of nodes and a plurality of links. Each Node indicates an intersection. Each link indicates a road that is present between intersections.

Location information is associated with each node and with each link. Transmission interval T (ms) of a location information message is associated with each link. Therefore, the location, which is indicated by the location information that corresponds to a link, is associated with the transmission interval that is associated with the link.

In FIG. 3, transmission interval $T_1$ is associated with link α that is present between nodes A-B, and transmission interval $T_2$ is associated with link β that is present between nodes B-C. In FIG. 3, vehicle 50, on which mobile terminal 10 is mounted, is described. However, the digital road map data does not have information about vehicle 50 on which mobile terminal 10 is mounted.

Location information measurement unit 13 is one example of identifying means and location identifying means.

By using GPS (Global Positioning System) and so on, location information measurement unit 13 identifies the current location of mobile terminal 10, that is to say, the location of the vehicle on which mobile terminal 10 is mounted. Location information measurement unit 13 generates location information that indicates the current location of mobile terminal 10. Location information measurement unit 13 generates the location information continuously.

Location information measurement unit 13 may be included in mobile terminal 10 or may be an external device. If location information measurement unit 13 is an external device, control unit 11 identifies the current location of mobile terminal 10 by using outputs of location information measurement unit 13 (location information). In other words, if location information measurement unit 13 is an external device, control unit 11 functions as identifying means and location identifying means.

Message generation unit 14 generates the location information message, which is to be notified to location management server 30, by using location information that is generated by location information measurement unit 13. Message generation unit 14 stores the identification information of mobile terminal 10 that is to be included in the location information message.

Radio transmission/receipt unit 15 is one example of communication means.

Radio transmission/receipt unit 15 performs data communication with location management server 30 via a carrier-communication network (not shown) that is provided by a carrier that manages base station 20 and a wide area packet network.

Radio transmission/receipt unit 15 successively transmits the location information message to location management server 30, which is to be a communication partner, at time intervals.

Radio transmission/receipt unit 15 communicates with mobile terminals 10, which are mounted on surrounding vehicles, as well as location management server 30. Therefore, the location information message is successively transmitted to mobile terminals 10, which are also mounted on surrounding vehicles.

Transmission interval judgment unit 16 is one example of setting means.

Transmission interval judgment unit 16 sets the interval of transmission of the location information message, which is carried out by radio transmission/receipt unit 15, in accordance with the location that is indicated by the location information generated by location information measurement unit 13.

In the present exemplary embodiment, transmission interval judgment unit 16 refers to storage unit 12 to read out the transmission interval (hereinbelow referred to as "corresponding transmission interval") that is associated with the location information generated by location information measurement unit 13. Transmission interval judgment unit 16 sets the corresponding transmission interval as the interval of transmissions of the location information messages that is carried out by radio transmission/receipt unit 15.

Next, location management server 30 will be described.

Location management server 30 is a server device that gathers location information from each mobile terminal 10 and that manages the location information. Location management server 30 includes control unit 31, storage unit 32 and radio transmission/receipt unit 33.

Control unit 31 controls a fundamental operation of location management server 30 such as task management and memory management and so on.

Storage unit 32 stores map data that is similar to the digital road map data stored in mobile terminal 10. The map data does not include any transmission intervals.

Radio transmission/receipt unit 33 performs data communication with mobile terminal 10.

The operation of the present exemplary embodiment is next described.

Mobile terminal 10 transmits a location information message to location management server 30 on the basis of the transmission interval that is associated with a link that is included in the digital road map data.

For example, if location information measurement unit 13 generates location information in a situation in which storage unit 12 stores the digital road map data that is indicated in FIG. 3, transmission interval judgment unit 16 acquires the location information via control unit 11.

Upon acquiring the location information, transmission interval judgment unit 16 identifies the link (hereinbelow referred to as "corresponding link") that is associated with the location information. For example, if mobile terminal 10 is at the location that corresponds to link α, transmission interval judgment unit 16 identifies link α as a corresponding link.

Next, transmission interval judgment unit 16 reads out the corresponding transmission interval (for example, 1 ms), which is the transmission interval associated with the corresponding link, from storage unit 12. The corresponding transmission interval is not limited to 1 ms and can be modified as appropriate. For example, if the corresponding link is link α, transmission interval judgment unit 16 reads out transmission interval $T_1$ as a corresponding transmission interval.

Subsequently, transmission interval judgment unit 16 sets the corresponding transmission interval as the interval of the transmission of a location information message that is performed by radio transmission/receipt unit 15. In the present exemplary embodiment, transmission interval judgment unit 16 sets the corresponding transmission interval in radio transmission/receipt unit 15 via control unit 11. For example, if the corresponding transmission interval is transmission interval $T_1$, transmission interval judgment unit 16 sets transmission interval $T_1$ as the interval of the transmission of a location information message that is performed by radio transmission/receipt unit 15.

If the corresponding transmission interval has already been set as the transmission interval in radio transmission/receipt unit 15, transmission interval judgment unit 16 maintains the setting of the transmission interval in radio transmission/receipt unit 15.

In the present exemplary embodiment, transmission interval judgment unit 16 sets the time interval (for example, T1 ms), which is indicated by the corresponding transmission interval, as the interval of generation of the location information message in message generation unit 14.

If the time interval, which is indicated by the corresponding transmission interval, has been already set as the interval of the generation of the location information message in message generation unit 14, transmission interval judgment unit 16 maintains the setting of the interval of the generation of the location information message in message generation unit 14.

Message generation unit 14 acquires the location information via control unit 11 at the generation interval that is set by transmission interval judgment unit 16, and successively generates the location information message that includes the location information and the identification information of mobile terminal 10.

Radio transmission/receipt unit 15 successively acquires the location information message from message generation unit 14 via control unit 11 at the generation interval that is set by transmission interval judgment unit 16, and successively transmits the location information message.

Therefore, as indicated in FIG. 3, when vehicle 50, on which mobile terminal 10 is mounted, travels on the road that is indicated by link α, the location information messages are transmitted at transmission interval $T_1$, after that, if vehicle 50, on which mobile terminal 10 is mounted, moves to the road that is indicated by link β, the location information messages are transmitted at transmission interval T2.

In location management server 30, radio transmission/receipt unit 33 receives the location information message that is transmitted from mobile terminal 10, and outputs the location information message to control unit 31.

Upon receiving the location information message, control unit 31 reads out the location information of mobile terminal 10 and the identification information of mobile terminal 10 from the location information message.

Subsequently, control unit 31 maps the identification information of mobile terminal 10 on the location of mobile terminal 10 (the location that is indicated by the location information of mobile terminal 10) in the map data in map data storage unit 32 (map matching).

Service provision server 40 provides telematics services that are used for vehicle or road-vehicle/vehicle-vehicle collaborative services on the basis of the location of mobile terminal 10 that is managed by location management server 30.

Regarding allocation of the transmission interval to the digital road map data, the transmission interval may be also associated with each node or may be associated with each division link part that is generated by dividing a link finely or may be associated with each area.

For example, if the transmission interval is associated with each area, storage unit 12 stores the transmission interval that is associated with each area, and transmission interval judgment unit 16 dynamically changes the transmission interval of the location information message on the basis of the location that is traveled by vehicle 50.

Figure 4:
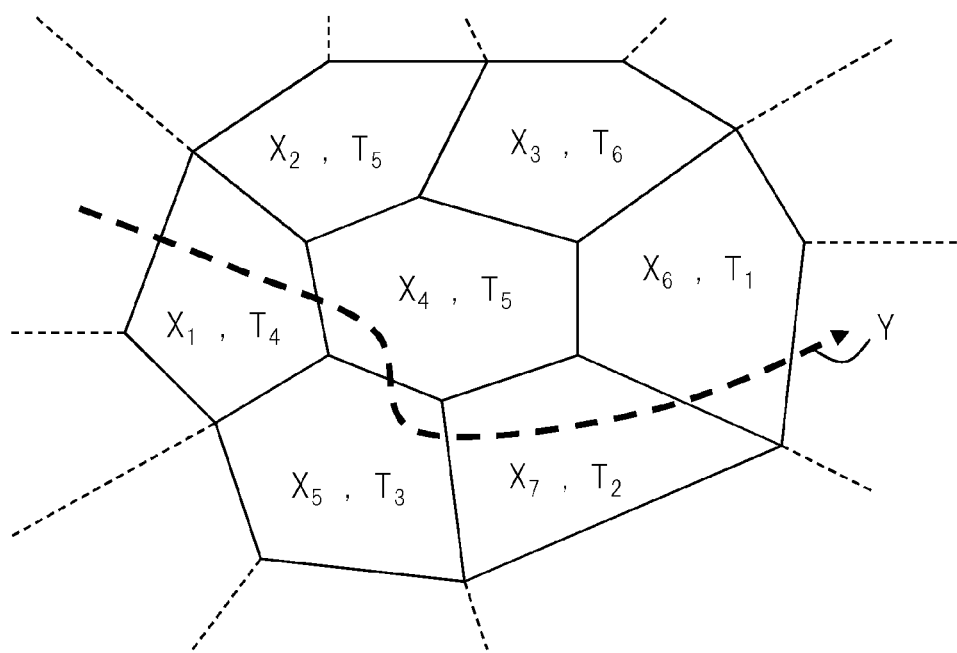
FIG. 4 is a diagram showing one example of the digital road map data where each transmission interval is associated with each area.

FIG. 4 is a diagram showing one example of the digital road map data where each transmission interval is associated with each area.

In FIG. 4, transmission intervals $T_4$, $T_5$, $T_6$, $T_5$, $T_3$, $T_1$ and $T_2$ are associated with areas $X_1$, $X_2$, $X_3$, $X_4$, $X_5$, $X_6$ and $X_7$ respectively.

Therefore, if vehicle 50, on which mobile terminal 10 is mounted, travels as indicated by arrow Y, the transmission interval of the location information messages is dynamically changed in order of transmission interval $T_4$, transmission interval $T_5$, transmission interval $T_3$, transmission interval $T_2$, transmission interval $T_1$.

As an example of using the present exemplary embodiment, "collision prevention support service" is studied in which surrounding vehicles are urged to pay attention to the vehicle, which has entered a specific area, such as an intersection, junction, or branching point, by notifying the surrounding vehicles of the location of the vehicle.

In "collision prevention support service", since it is necessary to precisely recognize the location information in the specific area (the area in an intersection, or a joining/branching point), it is necessary to acquire the location information at timing that is as close to real-time as much as possible. Therefore, it is necessary to shorten the transmission interval of the location information messages in the specific area.

Figure 5:
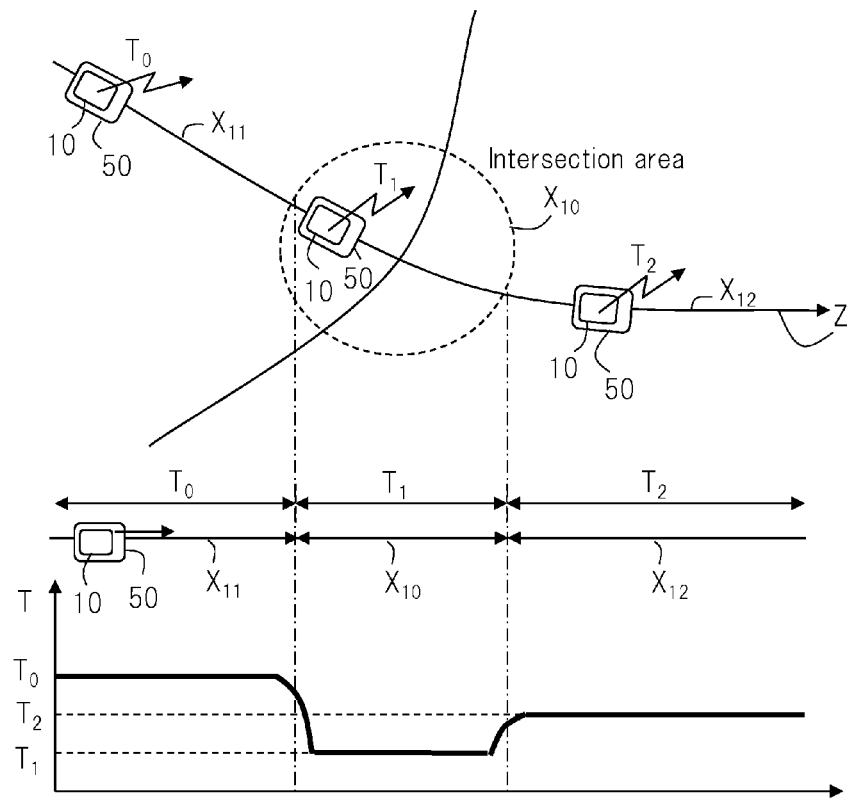
FIG. 5 is a diagram showing one example of the digital road map data.

FIG. 5 is a diagram showing one example of the digital road map data in which transmission interval $T_1$, transmission interval $T_0$, transmission interval $T_2$ are associated with intersection area $X_{10}$, adjacent area $X_{11}$ that is adjacent to intersection area $X_{10}$, adjacent area $X_{12}$, that is adjacent to intersection area $X_{10}$ respectively. Note that transmission interval $T_0$>transmission interval $T_2$>transmission interval $T_1$ is satisfied.

Therefore, if vehicle 50, on which mobile terminal 10 is mounted, travels as indicated by arrow Z, transmission interval at which the location information message is to be transmitted is changed in order of transmission interval $T_0$, transmission interval $T_1$, transmission interval $T_2$. The transmission interval of the location information message in intersection area $X_{10}$ is shorter than the transmission interval in adjacent areas $X_{11}$ or $X_{12}$. Therefore, it is possible to shorten the transmission interval at which the location information message is to be transmitted in the specific area (for example, an intersection area).

The effect of the present exemplary embodiment is next described.

In the present exemplary embodiment, location information measurement unit 13 identifies the location of mobile terminal 10. Radio transmission/receipt unit 15 successively transmits the location information message that indicates the location of mobile terminal 10. Transmission interval judgment unit 16 sets the transmission interval of the location information message in accordance with the location of mobile terminal 10.

Therefore, it is possible to lengthen the transmission interval at which the location information message is to be transmitted when mobile terminal 10 is present in the location where it is not necessary to transmit the location information message at high frequency, and to shorten the transmission interval at which the location information message is to be transmitted when mobile terminal 10 is present in the location where it is necessary to transmit the location information message at high frequency. Therefore, it is possible to improve the efficiency of the communication of the location information messages.

The effect described above is also exhibited in communication device 10 that is made up of location information measurement unit 13, radio transmission/receipt unit 15 and transmission interval judgment unit 16.

Figure 6:
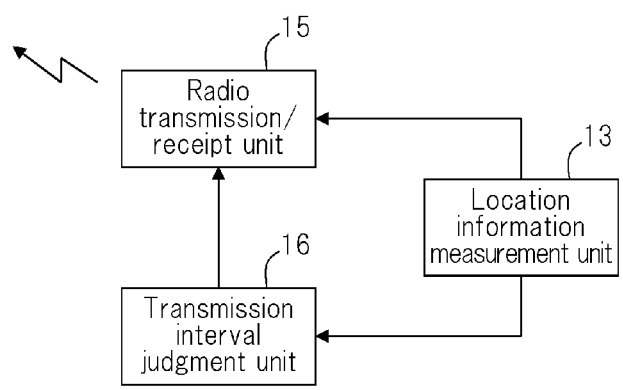
FIG. 6 shows a communication device that is made up of location information measurement unit 13, radio transmission/receipt unit 15 and transmission interval judgment unit 16.

FIG. 6 shows a communication device that is made up of location information measurement unit 13, radio transmission/receipt unit 15 and transmission interval judgment unit 16.

In the present exemplary embodiment, storage unit 12 stores a location and a transmission interval which are associated with each other. Transmission interval judgment unit 16 sets the transmission interval, which is associated with the location of mobile terminal 10 that is identified by location information measurement unit 13, as the transmission interval of the location information message.

Therefore, it is possible to manage the interval of the transmission of the location information message by using storage unit 12.

Second Exemplary Embodiment

Figure 7:
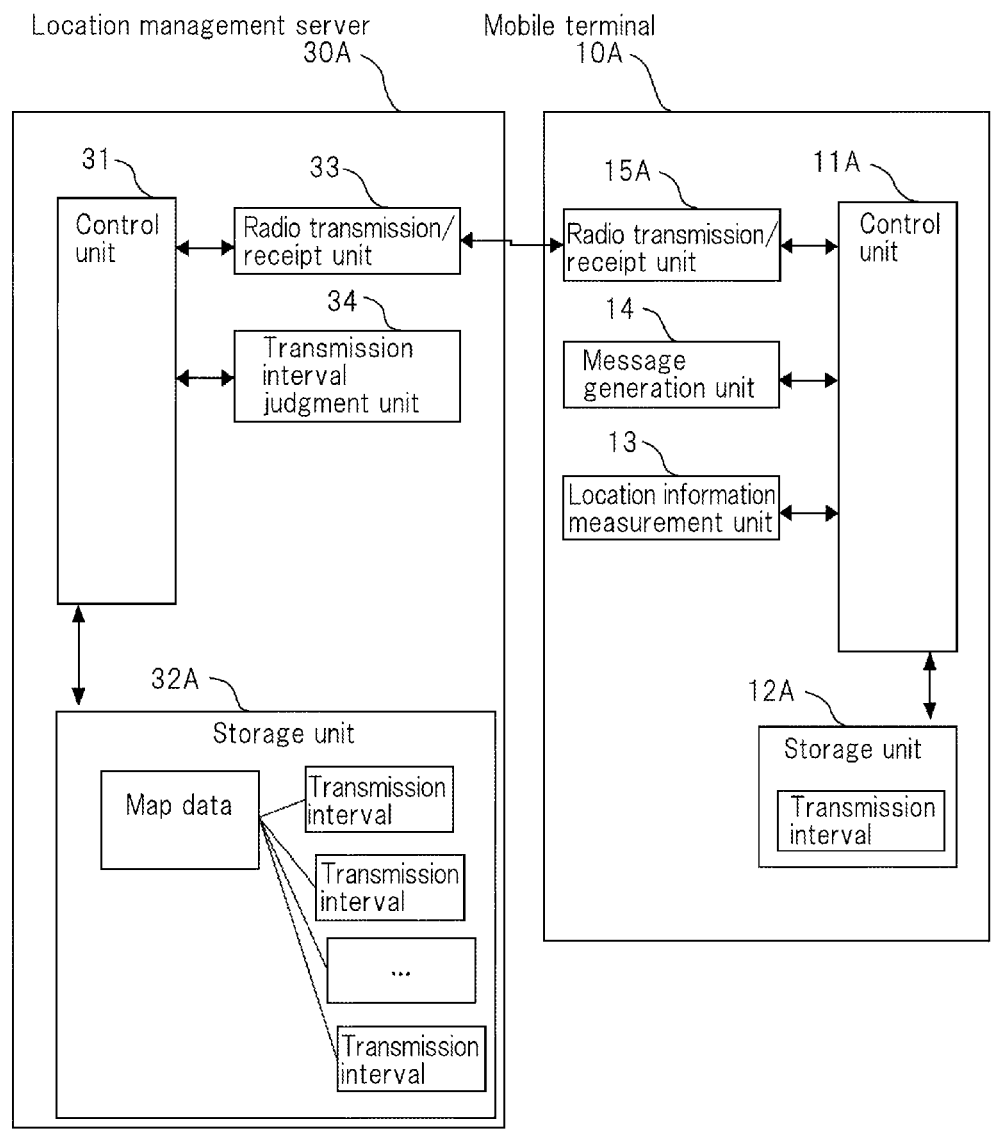
FIG. 7 is a diagram showing mobile terminal 10A and location management server 30A of the second exemplary embodiment according to the present invention.

FIG. 7 is a diagram showing mobile terminal 10A and location management server 30A of the second exemplary embodiment according to the present invention. In FIG. 7, the same reference signs are assigned to configurational elements identical to those shown in FIG. 2.

Mobile terminal 10A is used instead of mobile terminal 10 that is indicated by FIGS. 1 and 2. Location management server 30A is used instead of location management server 30 that is indicated by FIGS. 1 and 2.

The second exemplary embodiment is different from the first exemplary embodiment in that a process of setting of the transmission interval at which the location information message is to be transmitted is carried out by location management server 30A instead of a mobile terminal.

Regarding the second exemplary embodiment, points that are different from the first exemplary embodiment will be mainly explained.

First, mobile terminal 10A will be explained.

Mobile terminal 10A is one example of a communication device.

Mobile terminal 10A includes control unit 11A, storage unit 12A, location information measurement unit 13, message generation unit 14 and radio transmission/receipt unit 15A.

Radio transmission/receipt unit 15A is one example of communication means.

Radio transmission/receipt unit 15A transmits the location information message to location management server 30A that is a communication partner. Radio transmission/receipt unit 15A has a function of receiving a control message, which indicates the transmission interval that corresponds to location information in the location information message, from location management server 30A after transmitting the location information message. The control message is one example of transmission interval information.

Control unit 11A is one example of setting means.

Control unit 11A includes the functions that control unit 11 has. After radio transmission/receipt unit 15A receives the control message, control unit 11A sets the transmission interval, which is indicated by the control message, as the interval of the transmission of the location information message, which is performed by radio transmission/receipt unit 15A.

Storage unit 12A stores transmission interval information. At the initial state, storage unit 12A stores transmission interval information of default.

Next, location management server 30A will be explained.

Location management server 30A is one example of a transmission interval control device, and also one example of a communication partner.

Location management server 30A includes control unit 31, storage unit 32A, radio transmission/receipt unit 33 and transmission interval judgment unit 34. Radio transmission/receipt unit 33 is one example of communication means.

Storage unit 32A is one example of storage means.

Storage unit 32A stores a location and a transmission interval which are associated with each other. In the present exemplary embodiment, storage unit 32A stores digital road map data that is identical to the digital road map data in storage unit 12 that is described in FIG. 2.

Transmission interval judgment unit 34 is one example of communication control means.

When radio transmission/receipt unit 33 receives a location information message from mobile terminal 10, transmission interval judgment unit 34 refers to storage unit 32A via control unit 31 to identify the transmission interval (hereinafter referred to as "corresponding transmission interval"), which is associated with the location that is identified by the location information in the location information message, from among the transmission intervals in storage unit 32A.

Transmission interval judgment unit 34 generates a control message, which indicates the corresponding transmission interval, in order to transmit the control message to mobile terminal 10A that is a communication partner.

The operation of the second exemplary embodiment is next described.

Regarding the operation of the second exemplary embodiment, points that are different from the operation of the first exemplary embodiment will be mainly explained.

In mobile terminal 10A, control unit 11A sets the transmission interval (time interval) that is indicated by the transmission interval information in storage unit 12A as the generation intervals in message generation unit 13 and as the transmission interval in radio transmission/receipt unit 15A. As a result, radio transmission/receipt unit 15A, as well as radio transmission/receipt unit 15 in the first exemplary embodiment, transmits the location information message.

Upon receiving the location information message that has been transmitted from mobile terminal 10A, control unit 31 in location management server 30A reads out the location information of mobile terminal 10 and the identification information of mobile terminal 10 from the location information message.

Subsequently, control unit 31 maps the identification information of mobile terminal 10 on the location of mobile terminal 10A (the location that is indicated by the location information of mobile terminal 10A) in the map data in storage unit 32A.

Subsequently, control unit 31 outputs the result of the mapping to transmission interval judgment unit 34.

Upon receiving the result of the mapping, transmission interval judgment unit 34 stores the result of the mapping.

Subsequently, transmission interval judgment unit 34 determines whether or not the corresponding transmission interval (hereinafter referred to as "transmission interval this time"), which is associated with the mapping location indicated by the result of the mapping this time, is different from the corresponding transmission interval (hereinafter referred to as "last transmission interval") which is associated with the mapping location indicated by the last result of the mapping.

If the transmission interval this time is identical to the last transmission interval, transmission interval judgment unit 34 determines that it is not necessary to change the transmission interval at which the location information message is to be transmitted, and then deletes the last result of the mapping.

If the transmission interval this time is different from the last transmission interval, transmission interval judgment unit 34 determines that it is necessary to change the transmission interval at which the location information message is to be transmitted, and then generates a control message that indicates the transmission interval this time.

Subsequently, transmission interval judgment unit 34 transmits the control message to mobile terminal 10A, which is a communication partner, via control unit 31 and radio transmission/receipt unit 33, and then deletes the last result of the mapping.

In mobile terminal 10A, upon receiving the control message, radio transmission/receipt unit 15A outputs the control message to control unit 11A.

Upon receiving the control message, control unit 11A changes the transmission interval information in storage unit 12A into the transmission interval information that indicates the transmission interval that is indicated by the control message.

Subsequently, control unit 11A sets the transmission interval (the time interval), which is indicated by the transmission interval information that is changed in storage unit 12, as a generation interval in message generation unit 14 and as a transmission interval in radio transmission/receipt unit 15A, and then transmits the location information message at the transmission interval that is indicated by the transmission interval information that has been changed.

The effect of the present exemplary embodiment is next described.

According to the present exemplary embodiment, after radio transmission/receipt unit 15A transmits a location information message to location management server 30A, radio transmission/receipt unit 15A receives a control message, which indicates a transmission interval that corresponds to location information in the location information message, from location management server 30A.

After radio transmission/receipt unit 15A receives the control message, control unit 11A sets the transmission interval, which is indicated by the control message, as the transmission interval at which the location information message is to be transmitted.

According to the present exemplary embodiment, in location management server 30A communicates with mobile terminal 10A that is a communication partner. When radio transmission/receipt unit 33 receives a location information message of mobile terminal 10A from mobile terminal 10A, transmission interval judgment unit 34 transmits a control message, which indicates a transmission interval that corresponds to location information in the location information message, from radio transmission/receipt unit 33 to mobile terminal 10A.

Therefore, since location management server 30A determines an interval of the transmission of the location information message, mobile terminal 10A does not need to determine the interval of the transmission of the location information message.

In location management server 30A, storage unit 32A stores a location and a transmission interval which are associated with each other. When radio transmission/receipt unit 33 receives a location information message of mobile terminal 10A from mobile terminal 10A, transmission interval judgment unit 34 transmits a control message, which indicates a transmission interval that is associated, in storage unit 32A, with the location that is identified by the location information in the location information message, from radio transmission/receipt unit 33 to mobile terminal 10A.

Therefore, it is possible to manage the interval of the transmission of the location information messages by using storage unit 32A.

Third Exemplary Embodiment

Figure 8:
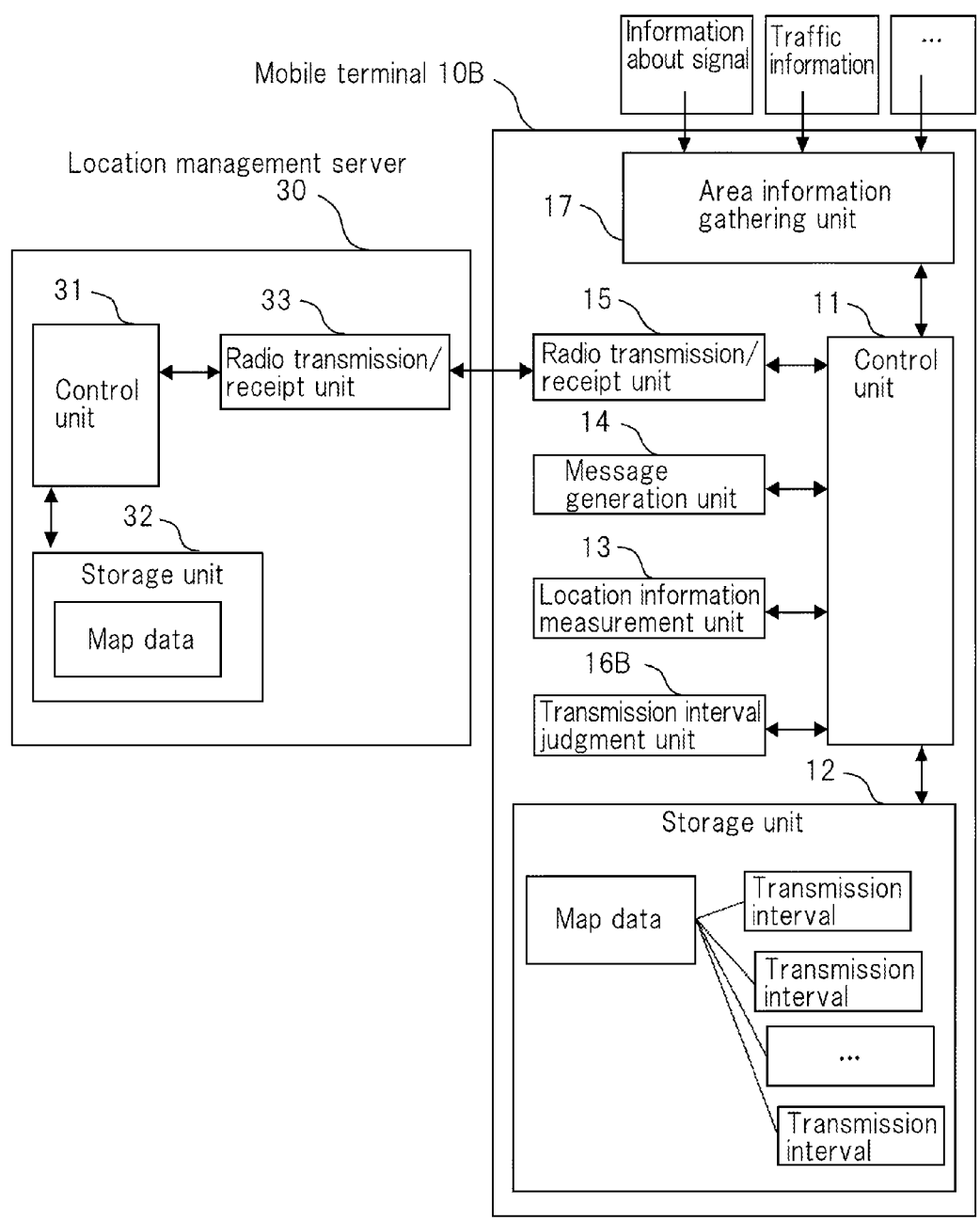
FIG. 8 is a diagram showing mobile terminal 10B of the third exemplary embodiment according to the present invention.

FIG. 8 is a diagram showing mobile terminal 10B of the third exemplary embodiment according to the present invention. In FIG. 8, the same reference signs are assigned to configurational elements identical to those shown in FIG. 2.

Mobile terminal 10B is used instead of mobile terminal 10 that is indicated by FIGS. 1 and 2.

The third exemplary embodiment is different from the first exemplary embodiment in that the transmission interval is set on the basis of the location of mobile terminal 10B and on the basis of the situation of the area in which mobile terminal 10B is present.

Regarding the third exemplary embodiment, points that are different from the first exemplary embodiment will be mainly explained.

In FIG. 8, mobile terminal 10B is one example of a communication device.

Mobile terminal 10B includes control unit 11, storage unit 12, location information measurement unit 13, message generation unit 14, radio transmission/receipt unit 15, transmission interval judgment unit 16B and area information gathering unit 17.

Area information gathering unit 17 is one example of area information acquisition means.

Area information gathering unit 17 acquires situation information that is used to identify a situation of the area where mobile terminal 10B is present. For example, the situation information indicates an external surrounding situation that relates to the travel of vehicles such as a signal situation (for example, timing when red signal becomes turned on) or a traffic situation (information that indicates whether or not there is a traffic jam) and so on. The situation information is one example of area information.

For example, a camera may be used as area information gathering unit 17. In this case, the camera takes images of a signal in front of the vehicle or images of other vehicles in front of the vehicle, and acquires the situation information (the situation of a signal or the traffic situation about traffic jam) from the images.

Transmission interval judgment unit 16B is one example of setting means.

Transmission interval judgment unit 16B sets the interval of the transmission of the location information message, which is carried out by radio transmission/receipt unit 15, in accordance with the location, which is indicated by the location information that is generated by location information measurement unit 13, and in accordance with the situation information that is acquired by area information gathering unit 17.

Transmission interval judgment unit 16B matches the interval of the generation of the location information message which is carried out by message generation unit 14 to the interval of the transmission of the location information message which is carried out by radio transmission/receipt unit 15.

The operation of the third exemplary embodiment is next described.

Regarding the operation of the third exemplary embodiment, points that are different from the operation of the first exemplary embodiment will be mainly explained.

First, as the first embodiment, "collision prevention support service" is described. In the first embodiment, area information gathering unit 17 acquires, at least, situation information that indicates a signal situation (information that indicates whether or not a signal indicates red).

Figure 9:
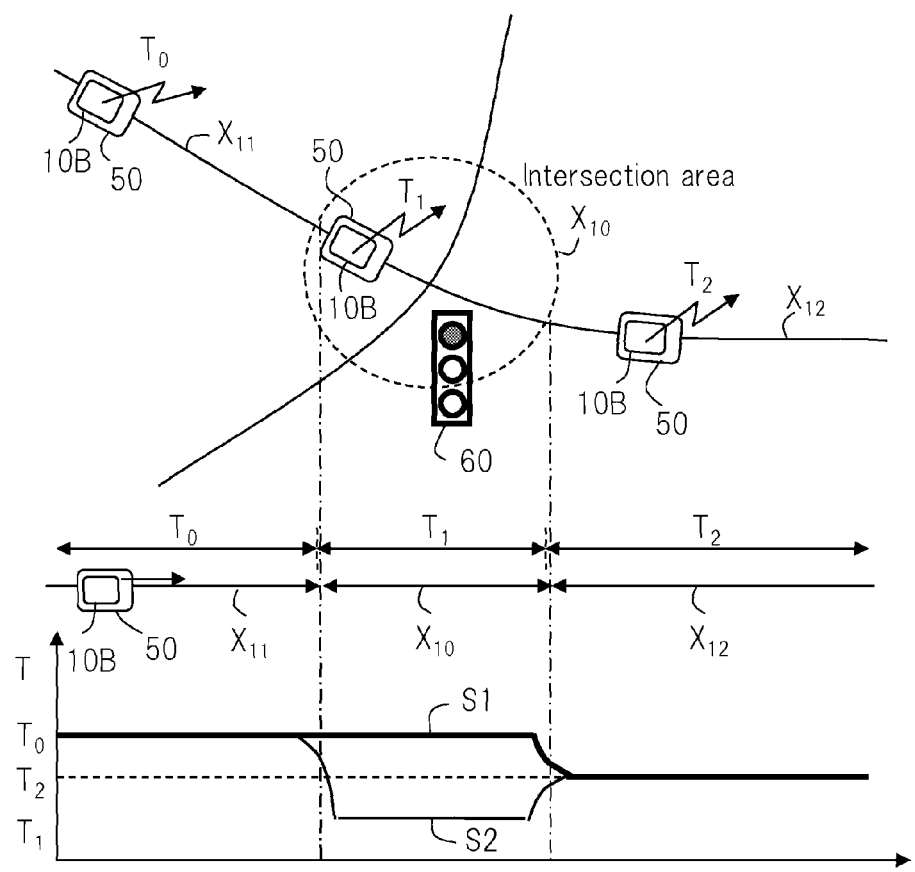
FIG. 9 is a diagram showing an operation of the third exemplary embodiment.

FIG. 9 is a diagram showing an operation of "collision prevention support service" of the third exemplary embodiment. In FIG. 9, the same reference signs are assigned to configurational elements identical to those shown in FIG. 5 or 8.

"Collision prevention support service", which is explained by referring to FIG. 5 in the first exemplary embodiment, is a service in which surrounding vehicles are urged to pay attention to the vehicle, which has entered a specific area such as an intersection and so on, by being notified of the location of the vehicle in advance.

Therefore, when vehicle 50, on which mobile terminal 10 is mounted, enters intersection area $X_{10}$, mobile terminal 10 in the first exemplary embodiment increases the transmission frequency by changing the transmission interval of the location information message from transmission interval $T_0$ to transmission interval $T_1$, thereby transmitting the location of vehicle 50 at timing that is close to real-time as much as possible.

However, when there is a signal at an intersection and when the signal indicates red, vehicle 50 stops in front of the signal thereby not entering the intersection, and then, even if the color that is indicated by the signal changes to blue, the approach speed of vehicle 50 in a situation in which vehicle 50 is entering the intersection is not very fast. Therefore, when vehicle 50 is stopped in accordance with the signal in the intersection, the need for notification of the location of vehicle 50 at timing that is as close to real-time as much as possible becomes low.

In the third exemplary embodiment, transmission interval judgment unit 16B refers to the location information, which is generated by location information measurement unit 13, and to the situation information that is acquired by area information gathering unit 17, and then maintains transmission interval $T_0$, without changing the interval of the transmission of the location information message that is carried out by radio transmission/receipt unit 15, when vehicle 50 is in intersection area $X_{10}$, in a situation in which the signal in front of vehicle 50 indicates red when vehicle 50 enters intersection area $X_{10}$ (refer to line S1 indicated in FIG. 9).

On the other hand, when the signal in front of vehicle 50 in intersection area $X_{10}$, indicates a color that is not red, when vehicle 50 enters intersection area $X_{10}$, transmission interval judgment unit 16B changes the interval of the transmission of the location information message that is carried out by radio transmission/receipt unit 15 into transmission interval $T_1$ (refer to line S2 indicated in FIG. 9) while vehicle 50 is in intersection area $X_{10}$. The way, in which transmission interval judgment unit 16B changes the interval of the transmission of the location information message that is carried out by radio transmission/receipt unit 15, is identical to the way that is implemented by transmission interval judgment unit 16 described in FIG. 2.

Therefore, it is possible to decrease notifications of unnecessary location information to surrounding vehicles.

According to the first embodiment of the third exemplary embodiment, area information gathering unit 17 acquires the situation information that is used to identify the situation of the area where mobile terminal 10B is present. Transmission interval judgment unit 16B sets, based on the location of mobile terminal 10B and based on the situation information, the interval of the transmission of the location information message that is carried out by radio transmission/receipt unit 15.

Therefore, it is possible to appropriately set the interval of the transmission of the location information message carried out by radio transmission/receipt unit 15 in accordance with the location of mobile terminal 10B and the situation of the area where mobile terminal 10 is present.

As the second embodiment of the third exemplary embodiment, an example, in which the transmission interval at which the location information is to be transmitted is dynamically changed by taking traffic density for each area into consideration, will be explained. In the second example, area information gathering unit 17 acquires, at least, situation information that indicates the traffic density of the area where mobile terminal 10 is present. For example, a camera is used as area information gathering unit 17, and this camera calculates the traffic density based on the number of vehicles in a detection range, and outputs the situation information that indicates the traffic density.

Transmission interval judgment unit 16B changes a transmission interval, which is associated with the road where mobile terminal 10B is present, in accordance with the traffic density that is indicated by the situation information. For example, transmission interval judgment unit 16B shortens the transmission interval, which is associated with the road where mobile terminal 10B is present, in accordance with an increase in the traffic density.

Transmission interval judgment unit 16B may change the transmission interval at which the location information message is to be transmitted in accordance with the traffic density that is indicated by the situation information without taking into account the location where mobile terminal 10B is present.

For example, transmission interval judgment unit 16B may receive the situation information that indicates the traffic density, and change the transmission interval linearly based on the traffic density. The situation information is one example of an input. In this case, assuming that the traffic density in the area where mobile terminal 10 is present is k (M that is the number of vehicles/D (km²)), transmission interval judgment unit 16B, for example, sets transmission interval T of the location information message on the basis of $T=\gamma*k$ ($\gamma$ is a linear coefficient.).

The formula of "$T=\gamma*k$" indicates that transmission interval T of the location information message linearly increases in accordance with an increase in traffic density k.

For example, "collision prevention support service" is a service that is effective when the traffic density is comparatively low. Therefore, in a congestion/traffic jam situation in which the number of vehicles in a area is large, the speed of a vehicle becomes low, accordingly, in "collision prevention support service", it is not necessary to frequently and in a timely manner carry out the notification of the location of the vehicle, and a reduction of the transmission interval is not needed.

Fourth Exemplary Embodiment

Figure 10:
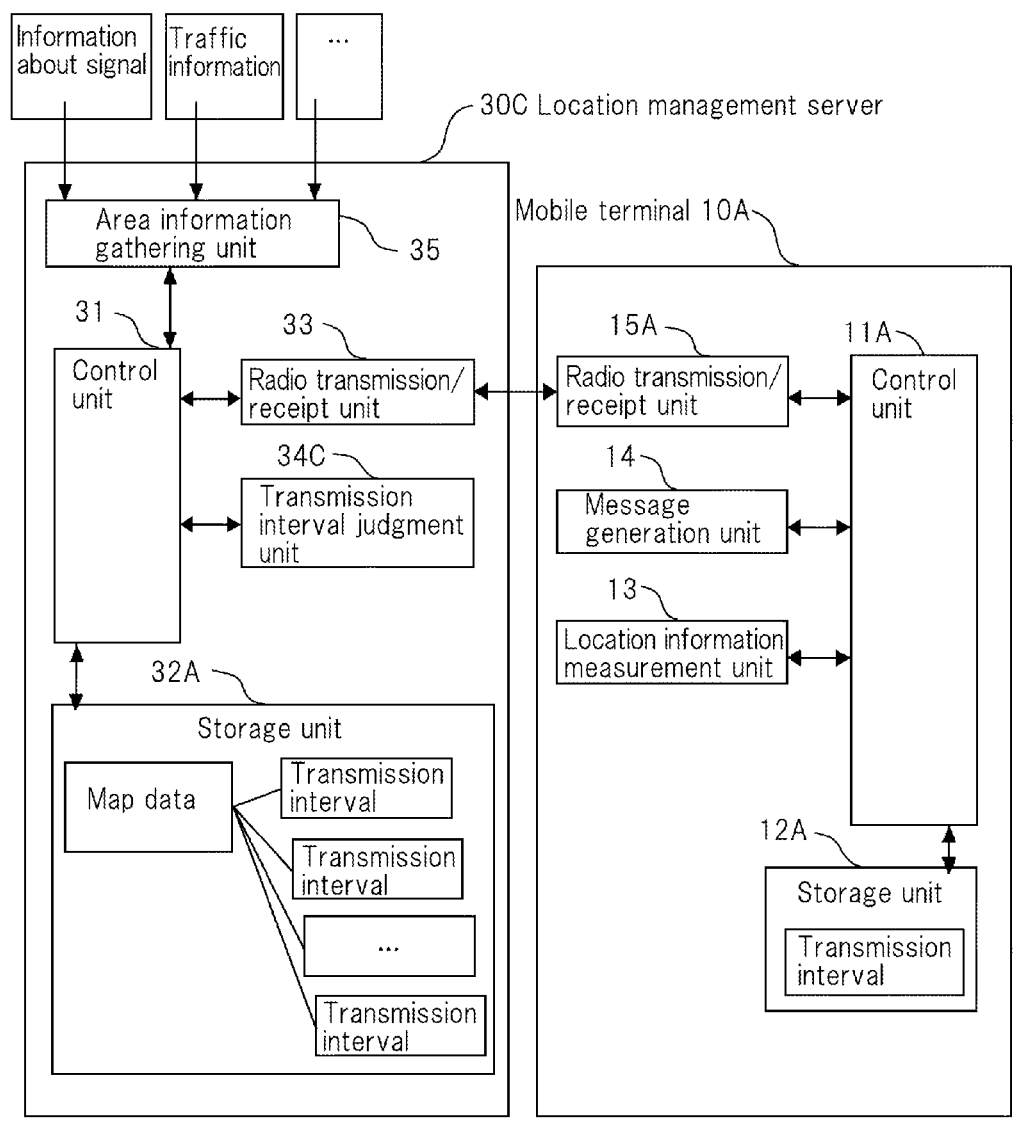
FIG. 10 is a diagram showing the fourth exemplary embodiment according to the present invention.

FIG. 10 is a diagram showing the fourth exemplary embodiment according to the present invention. In FIG. 10, the same reference signs are assigned to configurational elements identical to those shown in FIG. 7.

In the fourth exemplary embodiment, location management server 30C is used instead of location management server 30A that is indicated by FIG. 7.

The fourth exemplary embodiment is different from the second exemplary embodiment in that location management server 30C sets the transmission interval based on the location of mobile terminal 10A and based on the situation of the area where mobile terminal 10A is present.

Regarding the fourth exemplary embodiment, points that are different from the second exemplary embodiment will be mainly explained.

Location management server 30C includes control unit 31, storage unit 32A, radio transmission/receipt unit 33, transmission interval judgment unit 34C and area information gathering unit 35.

Area information gathering unit 35 acquires situation information, which is used to identify a situation of the area where mobile terminal 10A is present, by using the location information message transmitted from mobile terminal 10A. The situation information that is acquired by area information gathering unit 35 is identical to the situation information that is acquired by area information gathering unit 17 in the third exemplary embodiment.

Transmission interval judgment unit 34C generates a control message, which indicates the transmission interval this time, in accordance with the location, which is indicated by the location information described by the location information message transmitted from mobile terminal 10A, and in accordance with the situation information that is acquired by area information gathering unit 35.

For example, transmission interval judgment unit 34C determines the transmission interval this time by the same way as the way that is performed by transmission interval judgment unit 16B indicated in FIG. 8.

According to the present exemplary embodiment, it is possible to generate the same effect as the third exemplary embodiment.

Transmission interval judgment unit 34C may change the transmission interval at which the location information message is to be transmitted according to the traffic density that is indicated by the situation information without taking into consideration the location where mobile terminal 10A is present.

For example, transmission interval judgment unit 34C may receive the situation information that indicates the traffic density from area information gathering unit 35, and may linearly change the transmission interval in accordance with the traffic density. The situation information is one example of an input. In this case, a camera that is arranged at the one side of a road, such as at an intersection and so on, is used as area information gathering unit 35, and this camera may calculate the traffic density from the number of the vehicles in a detection area.

For example, transmission interval judgment unit 34C may change the transmission interval linearly in accordance with the traffic density. In this case, assuming that the traffic density in the area where mobile terminal 10A is present is k (M that is the number of vehicles/D (km$^2$)), transmission interval judgment unit 34C, for example, sets transmission interval T on the basis of T=γ*k (γ is a linear coefficient.). Transmission interval judgment unit 34C generates the control message that indicates transmission interval T in order to transmit the control message to mobile terminal 10A.

Fifth Exemplary Embodiment

Figure 11:
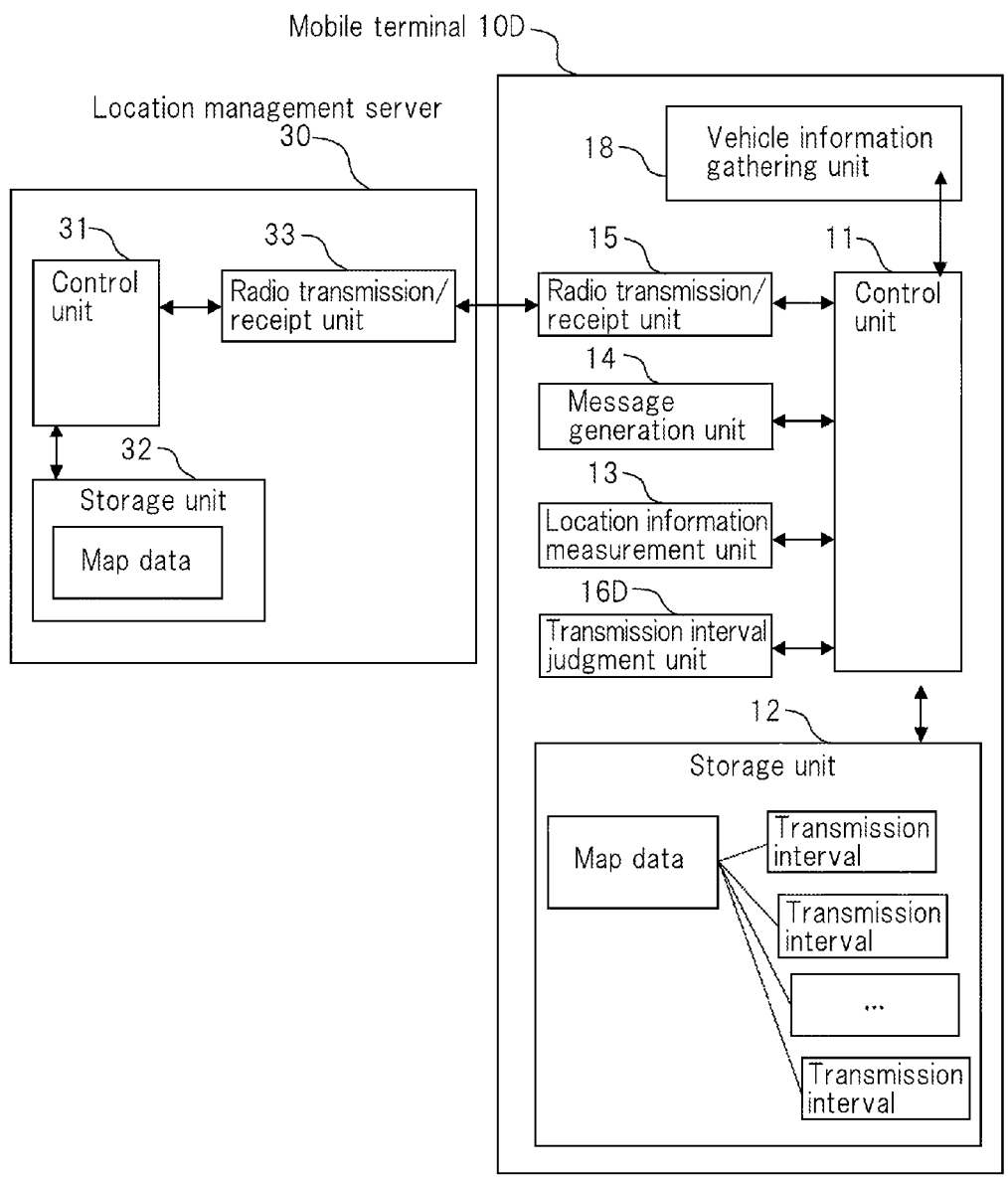
FIG. 11 is a diagram showing mobile terminal 10D in the fifth exemplary embodiment according to the present invention.

FIG. 11 is a diagram showing mobile terminal 10D in the fifth exemplary embodiment according to the present invention. In FIG. 11, the same reference signs are assigned to configurational elements identical to those shown in FIG. 2.

Mobile terminal 10D is used instead of mobile terminal 10 that is indicated by FIGS. 1 and 2.

The fifth exemplary embodiment is different from the first exemplary embodiment in that the transmission interval is set on the basis of the location of mobile terminal 10B and on the basis of the situation of the vehicle on which mobile terminal 10B is mounted.

Regarding the fifth exemplary embodiment, points that are different from the first exemplary embodiment will be mainly explained.

In FIG. 11, mobile terminal 10D is one example of a communication device.

Mobile terminal 10D includes control unit 11, storage unit 12, location information measurement unit 13, message generation unit 14, radio transmission/receipt unit 15, transmission interval judgment unit 16D and vehicle information gathering unit 18.

Vehicle information gathering unit 18 is one example of vehicle information input means.

Vehicle information gathering unit 18 acquires vehicle information, which indicates the speed, acceleration and direction of travel of the vehicle, on which mobile terminal 10D is mounted, and a state of an operation of a direction indicator of the vehicle, through a dedicated vehicle information gathering device or surrounding sensor information and so on, and identifies the state of the vehicle by using the vehicle information. The speed, the acceleration, the direction of travel and the state of the operation of the direction indicator are each examples of the state of a vehicle.

Transmission interval judgment unit 16D is one example of setting means.

Transmission interval judgment unit 16D sets the interval of the transmission of the location information message that is performed by radio transmission/receipt unit 15 in accordance with the location that is indicated by the location information generated by location information measurement unit 13 and in accordance with the vehicle information that is acquired by vehicle information gathering unit 18.

Transmission interval judgment unit 16D matches the interval of the generation of the location information message which is carried out by message generation unit 14 to the interval of the transmission of the location information message which is carried out by radio transmission/receipt unit 15.

The operation of the fifth exemplary embodiment is next described.

Regarding the operation of the fifth exemplary embodiment, points that are different from the operation of the first exemplary embodiment will be mainly explained. Vehicle information gathering unit 18 identifies the speed of mobile terminal 10D, that is to say, the speed of the vehicle on which mobile terminal 10D is mounted.

Figure 12:
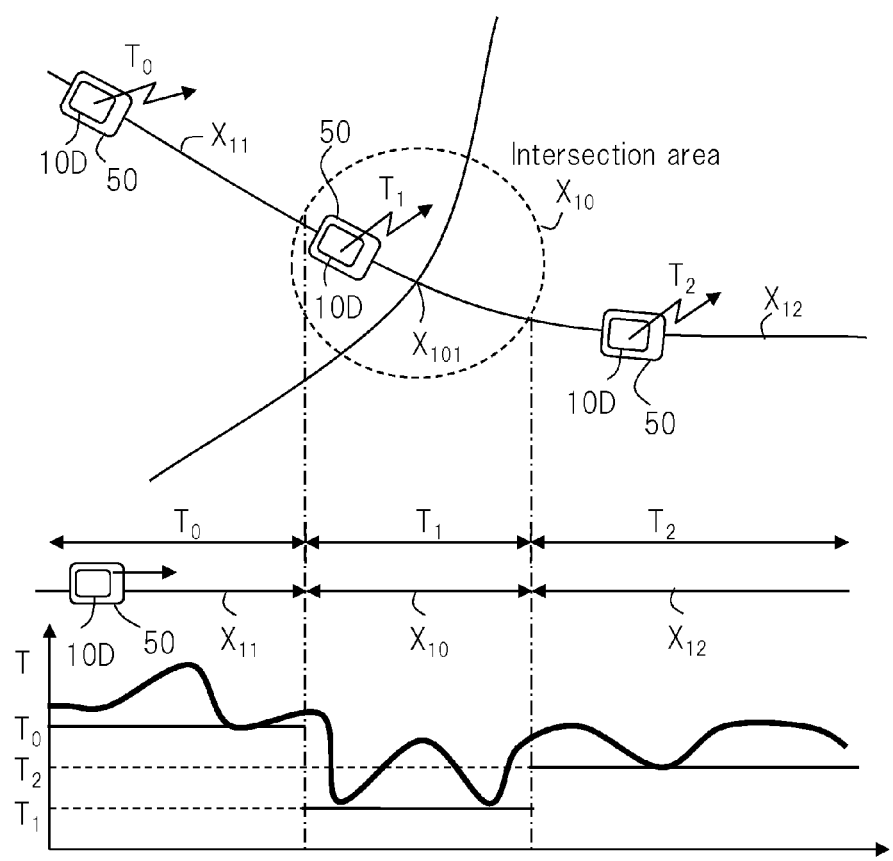
FIG. 12 is a diagram showing the operation of the fifth exemplary embodiment.

FIG. 12 is a diagram showing the operation of the fifth exemplary embodiment. In FIG. 12, the same reference signs are assigned to configurational elements identical to those shown in FIG. 5 or 11.

In the present exemplary embodiment, transmission interval judgment unit 16D uses transmission intervals $T_1$, $T_0$, $T_2$, which are associated with intersection area $X_{10}$, adjacent areas $X_{11}$ and $X_{12}$ respectively, as the shortest transmission interval for each area, and dynamically changes the transmission interval for each area according to the speed of mobile terminal 10D.

For example, transmission interval judgment unit 16D lengthens the transmission interval in accordance with decreasing the speed of mobile terminal 10D.

Transmission interval judgment unit 16D may set the minimum transmission interval (the transmission interval that is associated with the area where mobile terminal 10D is present) as the transmission interval of the location information message when mobile terminal 10D enters intersection area $X_{10}$ at the speed that is equal or more to reference speed, on the other hand, may set a transmission interval, which is longer than the minimum transmission interval, as the transmission interval of the location information message when mobile terminal 10D enters intersection area $X_{10}$ at the speed that is lower than the reference speed.

Transmission interval judgment unit 16D may set the transmission interval at which the location information massage is to be transmitted based on the location of mobile terminal 10D and based on the direction of the travel of mobile terminal 10D. The direction of the travel of mobile terminal 10D is acquired by vehicle information gathering unit 18.

For example, when the location of mobile terminal 10D is in intersection area $X_{10}$ and when the direction of the travel of vehicle 50, on which mobile terminal 10D is mounted, is the direction for intersection $X_{101}$ in intersection area $X_{10}$, transmission interval judgment unit 16D sets transmission interval $T_0$ as the transmission interval at which the location information message is to be transmitted.

On the other hand, when the location of mobile terminal 10D is in intersection area $X_{10}$ and when the direction of the travel of vehicle 50, on which mobile terminal 10D is mounted, is the direction away from intersection $X_{101}$ in intersection area $X_{10}$, transmission interval $T_2$ is set as the transmission interval at which the location information message is to be transmitted.

Transmission interval judgment unit 16D may change the transmission interval at which the location information message is to be transmitted according to the speed of mobile terminal 10D, without taking into account the location where mobile terminal 10B is present.

For example, transmission interval judgment unit 16D may receive the vehicle information that indicates the speed of mobile terminal 10D from vehicle information gathering unit 18, and may linearly change the transmission interval in accordance with the speed of mobile terminal 10D.

In this case, assuming that the transmission interval in a situation in which mobile terminal 10D (vehicle 50) is stopped is "$T_{10}$", and assuming that the speed of mobile terminal 10D (vehicle 50) is "V", transmission interval judgment unit 16D sets transmission interval T of the location information message on the basis of the formula to be $T=T_{10}*\exp(-\delta*V)$. "δ" is a linear coefficient.

The formula: $T=T_{10}*\exp(-\delta*V)$ indicates that transmission interval T is linearly decreased in accordance with an increase in speed V. Therefore, the transmission frequency of the location information in high-speed running becomes high, and it is possible to recognize the location of a vehicle in real time.

Transmission interval judgment unit 16D may change the transmission interval at which the location information message is to be transmitted on the basis of the acceleration of vehicle 50 on which mobile terminal 10D is mounted without taking into account the location where mobile terminal 10B is present.

For example, transmission interval judgment unit 16D receives the vehicle information that indicates the acceleration of mobile terminal 10D from vehicle information gathering unit 18, and shortens the transmission interval at which the location information message is to be transmitted in accordance with an increase in acceleration. The acceleration of vehicle 50 on which mobile terminal 10D is mounted is acquired by vehicle information gathering unit 18.

Transmission interval judgment unit 16D may change the transmission interval at which the location information message is to be transmitted on the basis of the direction of the travel of vehicle 50 on which mobile terminal 10D is mounted without taking into account the location where mobile terminal 10B is present.

For example, transmission interval judgment unit 16D receives the vehicle information, which indicates the direction of the travel of vehicle 50 on which mobile terminal 10D is mounted, from vehicle information gathering unit 18, and sets the transmission interval at which the location information message is to be transmitted that is shorter than a predetermined reference transmission interval when the direction of the travel of vehicle 50 on which mobile terminal 10D is mounted is the direction for an intersection area or a traffic jam area. The intersection area or traffic jam area is, for example, acquired by vehicle information gathering unit 18.

Transmission interval judgment unit 16D may change the transmission interval at which the location information message is to be transmitted on the basis of the state of the operation of the direction indicator of the vehicle 50 on which mobile terminal 10D is mounted without taking into account the location where mobile terminal 10B is present.

For example, transmission interval judgment unit 16D receives the vehicle information, which indicates the state of the operation of the direction indicator of the vehicle 50 on which mobile terminal 10D is mounted, from vehicle information gathering unit 18, and sets the transmission interval at which the location information message is to be transmitted that is shorter than a predetermined reference transmission interval when the direction indicator of the vehicle 50, on which mobile terminal 10D is mounted, is turned on. In this case, it is possible to be informed of the location of vehicle 50 in real time at the time when a vehicle changes lanes. Therefore, it is possible to prevent an accident from occurring at the time when a vehicle changes lanes.

In each exemplary embodiment, thought the transmission interval is associated with the location of the road in storage unit 12 or 32A, the transmission interval may be associated with the current date and time, the current time, a period of time, weather information such as the weather or the kind of vehicle (a model of a vehicle).

For example, the transmission interval, which is associated with the current date and time, the current time, a period of time, the weather or the kind of a vehicle at which a frequency of an occurrence of an accident is statistically higher than a reference value, is shorter than the transmission interval, which is associated with the current date and time, the current time, a period of time, the weather or a kind of a vehicle at which a frequency of an occurrence of an accident is statistically lower than the reference value.

In this case, each transmission interval judgment unit in a mobile terminal receives an input that indicates the current date and time, the current time, the state of the current weather or the kind of a vehicle on which a mobile terminal is mounted, and sets the transmission interval, which is associated with the input, as the transmission interval of the location information message. Each transmission interval judgment unit in a location management server receives an input that indicates the current date and time, the current time, the state of the current weather or the kind of vehicle on which a mobile terminal is mounted, and transmits the control message, which indicates the transmission interval that is associated with the input, from the radio transmission/receipt unit to a mobile terminal that is a communication partner. In this case, it is possible to appropriately set the transmission interval at which the location information message is to be transmitted in accordance with the current date and time, the current time, the state of the current weather or the kind of vehicle on which a mobile terminal is mounted.

In each exemplary embodiment, a mobile communication network is used as a communication medium between mobile terminals and a location management server. However, a communication medium between mobile terminals and a location management server is not limited to a mobile communication network and can be altered as appropriate. For example, as a communication medium between the location management server and mobile terminals, radio beacons, light beacons, radio LAN (Local Area Network) or WiMAX (Worldwide Interoperability for Microwave Access) may be used.

Each exemplary embodiment is applied to a communication between mobile terminals and a location management server, however, each exemplary embodiment may be applied to a communication between a mobile terminal and a mobile terminal that is, for example, performed in the so-called inter-vehicle communication.

According to each exemplary embodiment that is described above, by controlling the transmission interval at which the location information message is to be transmitted, it is possible to reduce an increase in traffic and in the pressure on the network bandwidth. Thus, it is possible to improve the efficiency of communication of the location information.

In each exemplary embodiment, each mobile terminal may be implemented by a computer. In this case, the computer reads and executes a program that is recorded on a recording medium such as a CD-ROM (Compact Disk Read Only Memory) that can be read in a computer and then performs the functions that the mobile terminal has. The recording medium is not limited to a CD-ROM and can be modified as appropriate.

In each exemplary embodiment, each location management server may be implemented by a computer. In this case, the computer reads and executes a program that is recorded on a recording medium that can be read in a computer and then performs the functions that the location management server has.

In each of the above-described exemplary embodiments, the configurations shown in the drawings are merely examples and the present invention is not limited to these configurations.

Although the invention of the present application has been described with reference to the exemplary embodiments, the invention of the present application is not limited to the above-described exemplary embodiments. The configuration and details of the invention of the present application are open to various modifications within the scope of the invention of the present application that will be clear to one of ordinary skill in the art. This application claims the benefits of priority based on Japanese Patent Application No. 2012-101445 for which application was submitted on Apr. 26, 2012 and incorporates by citation all of the disclosures of that application.

REFERENCE SIGNS LIST 100 communication system
10, 10A, 10B, 10D mobile terminal
11, 11A control unit
12, 12A storage unit
13 location information measurement unit
14 message generation unit
15, 15A radio transmission/receipt unit
16, 16B, 16D transmission interval judgment unit
17 area information gathering unit
18 vehicle information gathering unit
20 base station
30, 30A, 30C location management server
31 control unit
32, 32A storage unit
33 radio transmission/receipt unit
34, 34C transmission interval judgment unit
35 area information gathering unit
40 service provision server
50 vehicle

What is claimed is:

1. A communication device, which is to be mounted on a vehicle, comprising:
a location identifying unit that identifies a location of the communication device;
a communication unit that transmits, to a communication partner, location information of the communication device that is identified by the location identifying unit;
a link identifying unit that identifies a link or a node, which corresponds to the location information, on map data which comprises a plurality of nodes and a plurality of links, each node indicating an intersection and each link indicating a road between intersections; and
a setting unit that sets a transmission interval of the location information in accordance with the link or the node that is identified by the link identifying unit,
wherein the transmission interval of the location information is associated with each link on the map data.

2. The communication device according to claim 1, further comprising an area information acquisition unit that acquires area information that is used to identify a state of an area where the communication device is present, and
wherein the setting unit sets the transmission interval of the location information in accordance with the link or the node that corresponds to the location of the communication device and in accordance with the area information.

3. The communication device according to claim 1, further comprising a vehicle information input unit that acquires vehicle information that is used to identify a state of the vehicle, and
wherein the setting unit sets the transmission interval of the location information in accordance with the link or the node that corresponds to the location of the communication device and in accordance with the vehicle information.

4. A transmission interval control device comprising:
a communication unit that communicates with a communication partner; and
a communication control unit that, when the communication unit receives location information of the communication partner from the communication partner, identifies a link or a node, which corresponds to the location information, on map data which comprises a plurality of nodes and a plurality of links, each node indicating an intersection and each link indicating a road between intersections, and that transmits transmission interval information, which indicates a transmission interval according to the link or the node that is identified, from the communication unit to the communication partner,
wherein the transmission interval of the location information is associated with each link on the map data.

5. The transmission interval control device according to claim 4,
further comprising an area information acquisition unit that acquires area information that is used to identify a situation of an area where the communication partner is present, and
when the communication unit receives the location information of the communication partner from the communication partner, the communication control unit transmits transmission interval information, which indicates a transmission interval based on the link or the node that corresponds to the location information and based on the area information, from the communication unit to the communication partner.

6. A method for transmitting location information in a communication device that is to be mounted on a vehicle, comprising:
identifying a location of the communication device;
transmitting location information of the communication device to a communication partner;
identifying a link or a node, which corresponds to the location information, on map data which comprises a plurality of nodes and a plurality of links, each node indicating an intersection and each link indicating a road between intersections; and
setting a transmission interval of the location information in accordance with the link or the node that is identified,
wherein the transmission interval of the location information is associated with each link on the map data.

7. A method for controlling a transmission interval at which the location information is to be transmitted in a transmission interval control device, comprising:
upon receipt of location information of a communication partner from the communication partner, identifying a link or a node, which corresponds to the location information, on map data which comprises a plurality of nodes and a plurality of links, each node indicating an intersection and each link indicating a road between intersections; and
transmitting transmission interval information, which indicates a transmission interval based on the link or the node that is identified, to the communication partner,
wherein the transmission interval of the location information is associated with each link on the map data.

8. A non-transitory computer-readable storage medium that can be read into a computer and on which is recorded a program for causing a computer, which is to be mounted on a vehicle, to execute:
   an identifying procedure of identifying a location of the computer;
   a communication procedure of transmitting location information of the computer to a communication partner;
   an identifying procedure of identifying a link or anode, which corresponds to the location information, on map data which comprises a plurality of nodes and a plurality of links, each node indicating an intersection and each link indicating a road between intersections; and
   a setting procedure of setting a transmission interval of the location information in accordance with the link or the node that is identified,
   wherein the transmission interval of the location information is associated with each link on the map data.

9. A non-transitory computer-readable storage medium that can be read into a computer and on which is recorded a program for causing a computer to execute:
   a communication control procedure of: upon receipt of location information of a communication partner from the communication partner, identifying a link or a node, which corresponds to the location information, on map data which comprises a plurality of nodes and a plurality of nodes and a plurality of links, each node indicating an intersection and each link indicating a road between intersections; and transmitting transmission interval information, which indicates a transmission interval based on the link or the node that is identified, to the communication partner,
   wherein the transmission interval of the location information is associated with each link on the map data.

* * * * *